United States Patent
Patino et al.

(10) Patent No.: US 7,683,965 B2
(45) Date of Patent: Mar. 23, 2010

(54) SYSTEM AND METHOD FOR FLASH CONTROL

(75) Inventors: Joseph Patino, Pembroke Pines, FL (US); Jose F. Rodriguez, Miami, FL (US); Philip A. Schentrup, Hollywood, FL (US)

(73) Assignee: Motorola, Inc., Schaumburg, IL (US)

( * ) Notice: Subject to any disclaimer, the term of this patent is extended or adjusted under 35 U.S.C. 154(b) by 1361 days.

(21) Appl. No.: 11/025,508

(22) Filed: Dec. 29, 2004

(65) Prior Publication Data

US 2006/0139480 A1    Jun. 29, 2006

(51) Int. Cl.
H04N 5/222 (2006.01)
(52) U.S. Cl. .................. 348/370; 348/371; 348/372; 348/373; 348/374
(58) Field of Classification Search ......... 348/370–374; 396/176–179, 61; 455/550.1, 556.1, 571–575.1
See application file for complete search history.

(56) References Cited

U.S. PATENT DOCUMENTS

| | | | |
|---|---|---|---|
| 6,707,997 B2 | 3/2004 | Hirai et al. | |
| 6,710,578 B1 | 3/2004 | Sklovsky | |
| 6,754,447 B2 | 6/2004 | Lee et al. | |
| 2003/0013484 A1* | 1/2003 | Nishimura et al. | 455/556 |
| 2004/0085745 A1 | 5/2004 | Yoshihara | |

OTHER PUBLICATIONS

Linear Technology—Photoflash Capacitor Chargers with Automatic Refresh—LT3420/LT3420-1—www.linear.com—pp. 1 to 20.

* cited by examiner

*Primary Examiner*—Sinh Tran
*Assistant Examiner*—Yogesh K Aggarwal
(74) *Attorney, Agent, or Firm*—Larry G. Brown; Sylvia Chen (57) ABSTRACT

The invention concerns a method (200) and system (100) for flash control. The method can include the steps of—in a portable electronic device (122)—detecting (212) a request to operate a flash component (132), determining (214) whether to delay a timing of the operation of the flash component and if the timing will not be delayed, selectively disabling (224) a transmission component (114) for the portable electronic device. The selective disablement can create an operational opportunity (324) for the flash component. The method can also include the step of operating (224) the flash component during the created operational opportunity. As an example, the portable electronic device can be a mobile communications unit having a camera (136), the flash component can provide a flash for the camera and the transmission component can be a power amplifier (128).

15 Claims, 4 Drawing Sheets

SYSTEM AND METHOD FOR FLASH CONTROL

BACKGROUND OF THE INVENTION

1. Field of the Invention

This invention relates in general to wireless communications devices and more particularly, to systems and methods for controlling the operation of a camera flash for such devices.

2. Description of the Related Art

In today's marketplace, consumers have numerous wireless communications devices, such as cellular telephones and personal digital assistants, from which to choose. Many of these devices, particularly cellular telephones, have cameras integrated within them. Such cameras will capture images, and the user can then save the pictures or transfer them to another location. To help capture the images, some cellular telephones contain a flash. A number of cellular telephones that have flashes may contain a large capacitor for holding a charge that is high enough to operate the flash. Other cellular telephones, in an effort to eliminate costly and bulky capacitors, contain a number of light emitting diodes (LED) to generate a flash.

Unfortunately, a flash may draw a relatively large amount of current, such as for charging the capacitor or for providing current to operate the LEDs. As cellular telephones transmit voice and data, there is a possibility that the process of providing current to operate the flash may coincide with the transmission of voice or data. If such an event occurs, there is a chance that too much current will be drawn from the battery that powers the cellular telephone. In that case, a safety circuit in the battery may terminate the operation of the battery or the battery voltage may dip low enough to trigger a dead battery shutdown, which may result in consumer dissatisfaction with the cellular telephone.

SUMMARY OF THE INVENTION

The present invention concerns a method for flash control. The method can include the steps of—in a portable electronic device—detecting a request to operate a flash component and determining whether to delay a timing of the operation of the flash component. If the timing will not be delayed, the method can also include the steps of selectively disabling a transmission component for the portable electronic device to create an operational opportunity for the flash component and during the created operational opportunity, operating the flash component. The method can also include the step of reenabling the transmission component following the operation of the flash component.

In one arrangement, the determining whether to delay the timing step can include determining whether an output power of the transmission component is below a predetermined threshold. As an example, if the power output of the transmission component is below the predetermined threshold, the transmission component does not have to be disabled. Also, in this case, the method can further include operating the flash component while the transmission component is enabled (e.g., transmitting).

In another arrangement, the determining whether to delay a timing step can include determining whether a preexisting operational opportunity in a communications channel is within a predetermined time of the request to operate the flash component. If the preexisting operational opportunity in the communications channel is within the predetermined time, the transmission component does not have to be disabled. In this case, the method can further include operating the flash component during the preexisting operational opportunity. Conversely, if the preexisting operational opportunity in the communications channel is outside the predetermined time, the disabling of the transmission component can be performed.

As an example, the operating the flash component step can include at least one of charging a capacitor and providing current to an LED. In addition, the selectively disabling step can prevent an open circuit condition for a power source that provides power to the portable electronic device. As another example, the portable electronic device can be a mobile communications unit having a camera, the flash component can provide a flash for the camera and the transmission component can be a power amplifier.

The present invention also concerns a system for flash control. The system can include a flash component that produces a flash, a transmission component that transmits over a communications channel and a processor that is communicatively coupled to the flash component and the transmission component. The processor can be programmed to detect a request to operate the flash component and to determine whether to delay a timing of the operation of the flash component. If the timing will not be delayed, the processor can be further programmed to selectively disable the transmission component to create an operational opportunity for the flash component and to operate the flash component during the created operational opportunity. The system can also include suitable software and circuitry for performing the processes described above.

The present invention also concerns a portable electronic device for flash control. The portable electronic device can include a camera that captures images, a flash component that produces a flash for the camera, a transmission component that at least transmits over a communications channel and a processor that is communicatively coupled to the camera, the flash component and the transmission component. The processor can be programmed to detect a request to operate the flash component and to determine whether to delay a timing of the operation of the flash component. If the timing will not be delayed, the processor can be further programmed to selectively disable the transmission component to create an operational opportunity for the flash component and to operate the flash component during the created operational opportunity. The portable electronic device can also include suitable software and circuitry for performing the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention concerns a method and system for flash control. In one arrangement, the method can include the steps of—in a portable electronic device—detecting a request to operate a flash component, determining whether to delay a timing of the operation of the flash component and if the timing will not be delayed, selectively disabling a transmission component for the portable electronic device. The selective disabling can create an operational opportunity for the flash component. The method can also include the step of operating the flash component during the created operational opportunity.

In another arrangement, if the power output of the transmission component is below a predetermined threshold, the transmission component does not have to be disabled. In addition, the flash component can be operated while the transmission component is enabled. In yet another arrangement, it can be determined whether a preexisting operational opportunity in a communications channel is within a predetermined time of the request to operate the flash component. If so, the transmission component does not have to be disabled, and the flash component can be operated during the preexisting operational opportunity. As another example, if the preexisting operational opportunity in the communications channel is outside the predetermined time, the selectively disabling step can be performed.

Figure 1:
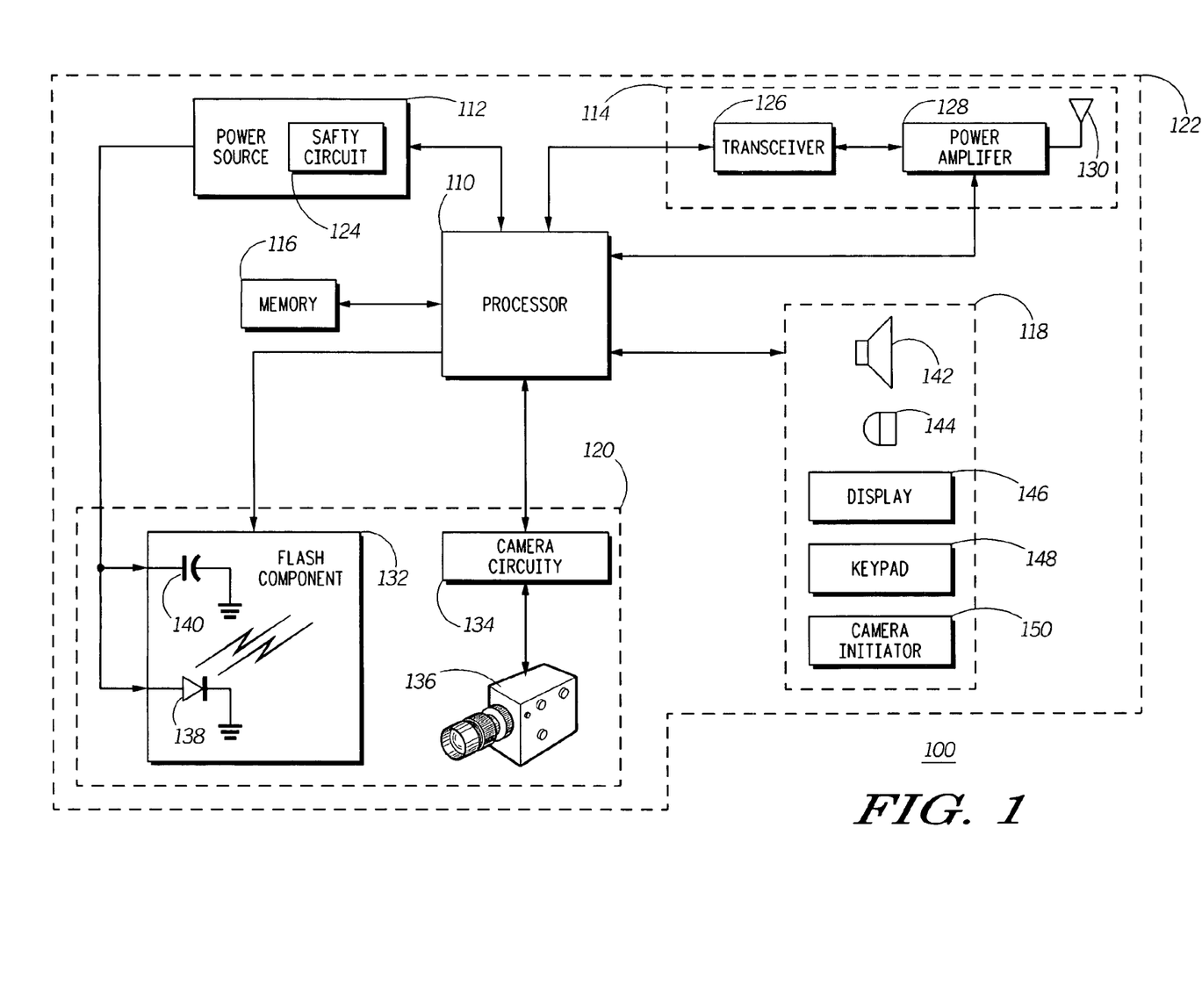
FIG. 1 illustrates a system for flash control in accordance with an embodiment of the inventive arrangements.

Referring to FIG. 1, a system 100 for flash control is shown. The system 100 can include a processor 110, a power source 112, a transmission component 114, a memory 116, a user interface section 118 and a camera section 120. As an example, the system 100 can be part of a portable electronic device 122, such as a mobile communications unit. Each of the power source 112, the transmission component 114, the memory 116, the user interface section 118 and the camera section 120 can be communicatively coupled to the processor 110.

In one arrangement, the power source 112 can be a battery, such as a rechargeable battery, and can include a safety circuit 124. The power source 112 can provide power to the components of the portable electronic device 122, and the safety circuit 124 can protect the power source 112 from overheating, for example. In one particular embodiment, the safety circuit 124 can shut down the power source 112 if the current being drawn from the power source 112 reaches a safety threshold. Also, because of excessive current being drawn from the power source 112, the safety circuit 124 may detect a low voltage condition at the power source 112. The safety circuit 124 may also shut down the power source 112 based on this low voltage condition. The safety circuit 124 can shut down the power source 112 by disabling one or more circuits between the power source 112 and the portable electronic device 122. It is understood that this invention is applicable to a power source 112 that does not contain a safety circuit 124.

In another arrangement, the transmission component 114 can include a transceiver 126, a power amplifier 128 and an antenna 130. As is well known in the art, the transceiver 126 can process signals that have been received or are about to be transmitted from the portable electronic device 122, and the power amplifier 128 can amplify the signals that are about to be transmitted. It must be noted, however, that the transmission component 114 is not limited to this particular configuration. In fact, the transmission component 114 can be any component or element that enables the portable electronic device 122 to conduct wireless communications, including the receipt and transmission of such communications.

The camera section 120 can include a flash component 132, a camera circuitry block 134 and a camera 136. The camera 136 and the camera circuitry 134, which may include a graphics accelerator and other components to support the camera 136, can work together to capture and provide images. These images may be stored in the memory 116, for example, which can also store instructions for the processor 110 to function in accordance with the inventive arrangements.

The flash component 132 can be any mechanism for providing a flash for the camera 136. As an example, the flash component 132 can be one or more LEDs 138. These LEDs 138 can also receive current from the power source 112. Alternatively, the flash component 132 can be a conventional flash bulb (not shown), and the flash component 132 can have a capacitor 140 that can be charged to provide current for the flash bulb. The power source 112 can also provide the charging current to the capacitor 140.

The user interface section 118 can include a speaker 142, a microphone 144, a display 146, a keypad 148 and a camera initiator 150, all of which may be communicatively coupled with the processor 110. As is known in the art, the speaker 142 can broadcast audio signals, and the microphone 144 can capture audio signals. The display 146 can display images (including text) to a user, and the user can enter information into the portable electronic device 122 through the keypad 148. The user may also enter information into the portable electronic device 122 through the display 146, if the display 146 is so configured.

The camera initiator 150 can be any mechanism that a user can activate when, for example, the user wishes to capture one or more images with the camera 136. As an example, the camera initiator 150 can be a button separate from the keypad 148 or can be a button on the keypad 148, such as a programmable button. When activated, the camera initiator 150 can signal the processor 110, which can enable the processor 110 to determine that the user wishes to capture one or more images.

Figure 2:
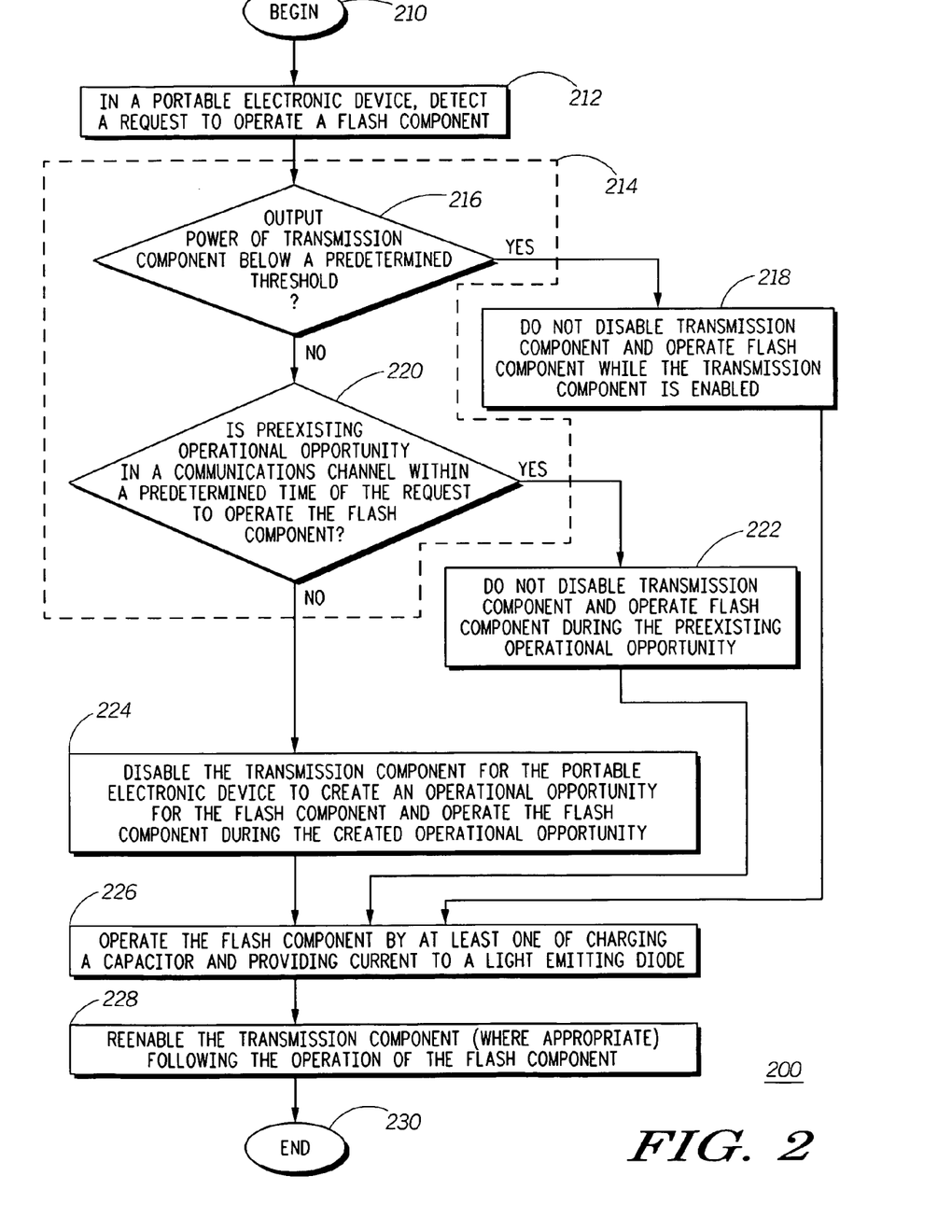
FIG. 2 illustrates a method for flash control in accordance with an embodiment of the inventive arrangements.

To describe the operation of the system 100, reference will be made to FIG. 2, which presents a method 200 for flash control. It is understood, however, that the method 200 may be practiced in any other suitable system. Moreover, the invention is not limited to the order in which the steps are listed in the method 200. In addition, the method 200 can contain a greater or a fewer number of steps than those shown in FIG. 2.

The method 200 can begin at step 210. At step 212, in a portable electronic device, a request to operate a flash component can be detected. At step 214, it can be determined whether to delay a timing of the operation of the flash component. There are several ways to accomplish this procedure, and the method 200 presents several exemplary steps for doing so. In particular, the decision block 216 and the decision block 220, both of which will be explained below, provide a manner for determining whether to delay the timing of the operation of the flash component.

Specifically, at decision block 216, it can be determined whether an output power of a transmission component is below a predetermined threshold. If it is, the method 200 can continue to step 218, where the transmission component does not have to be disabled and the flash component can be operated when the transmission component is enabled. If the output power of the transmission component is above the predetermined threshold, the method 200 can continue to the decision block 220.

At the decision block 220, it can be determined whether a preexisting operational opportunity in a communications channel is within a predetermined time of the request to operate the flash component. If it is, the method 200 can resume at step 222. At step 222, the transmission component does not have to be disabled, and the flash component can be operated during the preexisting operational opportunity.

If the preexisting operational opportunity is not within the predetermined time (which also includes the absence of preexisting operational opportunities), the method 200 can continue to step 224. At step 224, the transmission component for the portable electronic device can be disabled to create an operational opportunity, and the flash component can be operated during this created operational opportunity. At step 226, the flash component can be operated by at least one of charging a capacitor and providing current to an LED. In addition, where appropriate, the transmission component can be reenabled following the operation of the flash component. The method 200 can then end at step 230.

For example, referring to FIG. 1, a user of the portable electronic device 122 may wish to capture an image using the camera 136. The user can activate the camera initiator 150, which can signal the processor 110. Because the portable electronic device 122 may have the ability to transmit and receive wireless signals, the operation of the flash component 132 may cause excessive current to be drawn from the power source 112.

Figure 3:
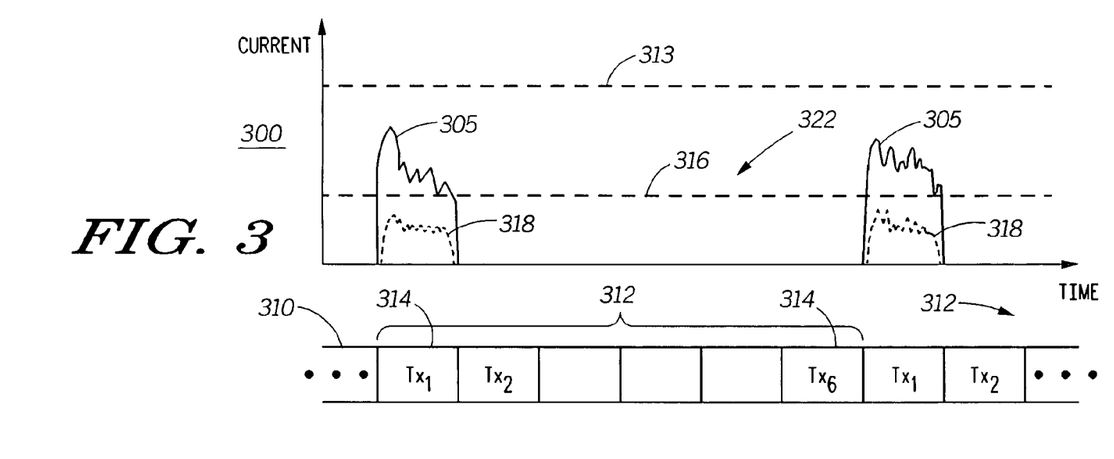
FIG. 3 illustrates an example of a diagram of a transmission of a voice signal in accordance with an embodiment of the inventive arrangements.

Referring to FIG. 3, a diagram 300 representing an example of a transmission process is shown. Reference may be made to FIG. 2 to help explain FIG. 3. In this example, the transmission process can relate to the transmission of a voice signal 305 over a communications channel 310 in a time division multiple access (TDMA) system with a 6:1 compression ratio, although any other suitable ratio can be used here.

A corresponding current versus time graph that illustrates the voice signal 305 is positioned above the communications channel 310. The voice signal 305 is actually a radio frequency (RF) representation of a voice signal.

As an example, the communications channel 310 can be segmented into frames 312, each of which may be roughly 90 milliseconds (ms) in duration. As another example, the frames 312 can include six slots 314, each of which may be approximately 15 ms in duration. As is known in the art, one slot 314 in each frame 312 may be assigned to the portable electronic device 122 for transmission of the voice signal 305. In this example, the first slot 314, which may be referred to as $T_{X1}$, can be assigned to the portable electronic device 122, and the transmission component 114 can cause the voice signal 305 to be transmitted during this slot 314.

The diagram 300 also shows a safety threshold 313, which is represented by a dashed line. This safety threshold 313 can be the predetermined current level at which the safety circuit 124 disables the power source 112. The safety threshold 313 can also refer to a predetermined current level that may cause a voltage slump, which may prompt the safety circuit 124 to disable the power source 112. If the flash component 132 is operated as the voice signal 305 is transmitted, the total current may surpass the safety threshold 313. If the power source 112 does not have a safety circuit 124, the safety threshold 313 can be the current level at which the operation of the battery may be negatively affected, such as excessive battery life degradation or overheating. As a result, it may be desirable to avoid operating the flash component 132 during this slot 314 (slot $T_{X1}$). Subsequent slots 314 may be assigned to other mobile units.

Figure 4:
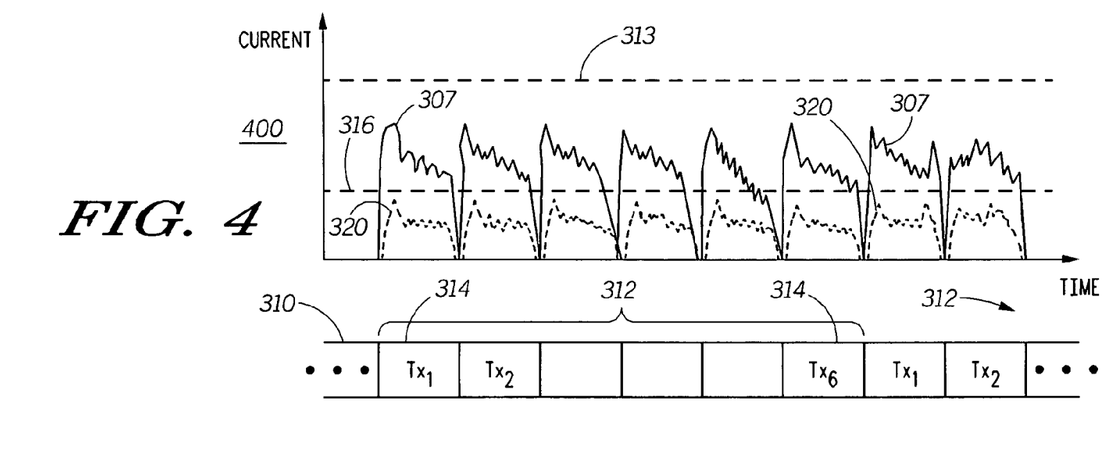
FIG. 4 illustrates an example of a diagram of a transmission of a data signal in accordance with an embodiment of the inventive arrangements.

As another example, the electronic device 122 may transmit data signals. Referring to FIG. 4, a diagram 400 showing the transmission of a data signal 307 is shown (the data signal 307 is an RF representation of a data signal). Again, reference may also be made to FIG. 2 to help describe FIG. 4. The communications channel 310 may have the same configuration here, except that, as is known in the art, the number of slots 314 assigned to the portable electronic device 122 for the transmission of the data may be much higher. That is, although it may still be sectionalized like the voice signal, all the slots 314 in a number of frames 312 may be assigned to the portable electronic device 122 for the continuous transmission of at least a portion of the data. This configuration is reflected in the current versus time graph of the diagram 400.

The number of slots 314 assigned for the continuous transmission of the data may be predetermined such that there is a cap in the amount of time to be spent on a transmission of the data (or at least the portion of the data). For example, the predetermined number of slots 314 may be eighty-one, which is equivalent to about 1.215 seconds of time. Once transmitted, other mobile units may use the communications channel 310. The transmission of the data, if some of it remains to be sent, can be transmitted at the next available time in accordance with the above description. As can be seen, it may be desirable to avoid operating the flash component 132 during the transmission of the data signal 307 to prevent the total amount of current being drawn from the power source 112 to reach the safety threshold 313.

Referring to FIGS. 1, 3 and 4, there are a number of ways to determine when it is acceptable to operate the flash component 132. In one arrangement, once the processor 110 receives the signal from the camera initiator 150, the processor 110 can determine whether the output power of the transmission component 114 is below a predetermined threshold. For example, as is known in the art, as the portable electronic device 122 moves closer to, for example, a base station (not shown) that is currently serving the portable electronic device 122, the amount of power required to transmit signals to the base station can be reduced. As an example, the processor 110 may instruct the power amplifier 128 of the transmission component 114 to reduce its power output. This reduced power output may enable the flash component 132 to be operated as the portable electronic device 122 is transmitting voice or data signals.

For example, referring to the diagrams 300 and 400, a predetermined threshold 316 represented as a dashed line is shown. The predetermined threshold 316 can be a current value. If the power output of the transmission component 114 remains below this value, the possibility of exceeding the safety threshold 313 can be significantly diminished or eliminated. The processor 110 can determine whether the output power of the transmission component 114 (e.g., the power amplifier 128) is below the predetermined threshold 316, which may be reduced based on the circumstances described above. This possibility is shown for both the voice signal 305 and the data signal 307 in the form of a voice signal 318 and a data signal 320, respectively.

If the power output of the transmission component 114 remains below this predetermined threshold 316, the processor 110 does not have to disable the transmission component 114. That is, the flash component 132 can be operated while the transmission component 114 is enabled, such as when the transmission component 114 is transmitting a signal.

If the processor 110 determines that the power output of the transmission component 114 is above the predetermined threshold 316, the processor 110 can determine if a preexisting operational opportunity is in the communications channel 310. The processor 110 can also determine whether this preexisting operational opportunity is within a predetermined time of the request to operate the flash component 132.

For example, if the transmission component 114 is transmitting voice, such as the voice signal 305 of FIG. 3, the processor 110 can determine that a preexisting operational opportunity 322 exists in the communications channel 310. Here, the preexisting operational opportunity 322 can be the time between the slots 314 that are assigned to the portable electronic device 122. For purposes of the invention, a preexisting operational opportunity can be any part of a communications channel where, in accordance with a predetermined sequence of the communications channel, a transmission component will not be transmitting. Also, the amount of time that the transmission component will not be transmitting should be long enough to allow a flash component to operate. Here, the preexisting operational opportunity 322 is suitable because it occurs in accordance with the transmission protocol and because it allows enough time for the flash component 132 to operate, which may be roughly 30 ms, for example.

Referring back to the example, assume the transmission component 114 is transmitting when the processor 110 receives the request to operate the flash component 132, such as that pictured in the slot 314 designated with $T_{X1}$ of the diagram 300. The processor 110 can determine that waiting for this brief transmission process to end before the preexisting operational opportunity 322 arrives to operate the flash component 132 is acceptable, as the slot 314 may be only 15 ms in duration. A delay of 15 ms is most likely not noticeable by a user of the camera 136. To determine whether the time to wait to operate the flash component 132 is acceptable, the processor 110 can compare this time to a predetermined time. This predetermined time can be the maximum amount of time that is deemed acceptable to delay the operation of the flash component 132, any suitable value can be used.

During the time that the processor 110 is waiting for the preexisting operational opportunity 322 to arrive, it may become unnecessary to continue the transmission of the voice signal 305 or the data signal 307. For example, a user may discontinue a call or the transmission of data may be completed while the processor 110 during the acceptable delay period (which is below the predetermined time described above). At this point, because the transmission component 114 is no longer transmitting the voice signal 305 or the data signal 307, the processor 110 can operate the flash control 132 without waiting for the remainder of the delay period for the preexisting operational opportunity 322 to arrive. This type of an operational opportunity may be referred to as a supplemental preexisting operational opportunity.

Referring to FIG. 4, the processor 110 may determine that a preexisting operational opportunity exists, but it may be too long of a delay to wait for its arrival. As noted earlier, the continuous transmission of the data signal 307 may be capped at some point, but the transmission component 114 may transmit the data signal 307 up to 1.215 seconds for a particular cycle. The request to operate the flash component 132 may be received near the end of the transmission of the data signal 307 such that the time to wait for the preexisting operational opportunity is below the predetermined time described above. As a result, the processor 110 can delay the operation of the flash component 132 until the preexisting operational opportunity arrives.

There may be circumstances where the processor 110 determines that the delay for the preexisting operational opportunity exceeds the predetermined time. In this case, it may not be desirable to have a user wait too long before the flash component 132 is allowed to operate. In fact, the processor 110 may determine that no preexisting operational opportunities exist. As a result, the processor 110 can cause the transmission component 114 to be temporarily disabled, which can create an operational opportunity to permit the flash component 132 to operate. For example, referring to FIG. 5, a diagram 500 is shown. The diagram 500 is similar to the diagram 400 of FIG. 4 in that the transmission component 114 is transmitting a data signal 307. In this case, however, the processor 110 may detect the request to operate the flash component 132 just as the transmission component 114 is beginning to transmit the data, such as at the first slot 314 designated by $T_{X1}$.

Figure 5:
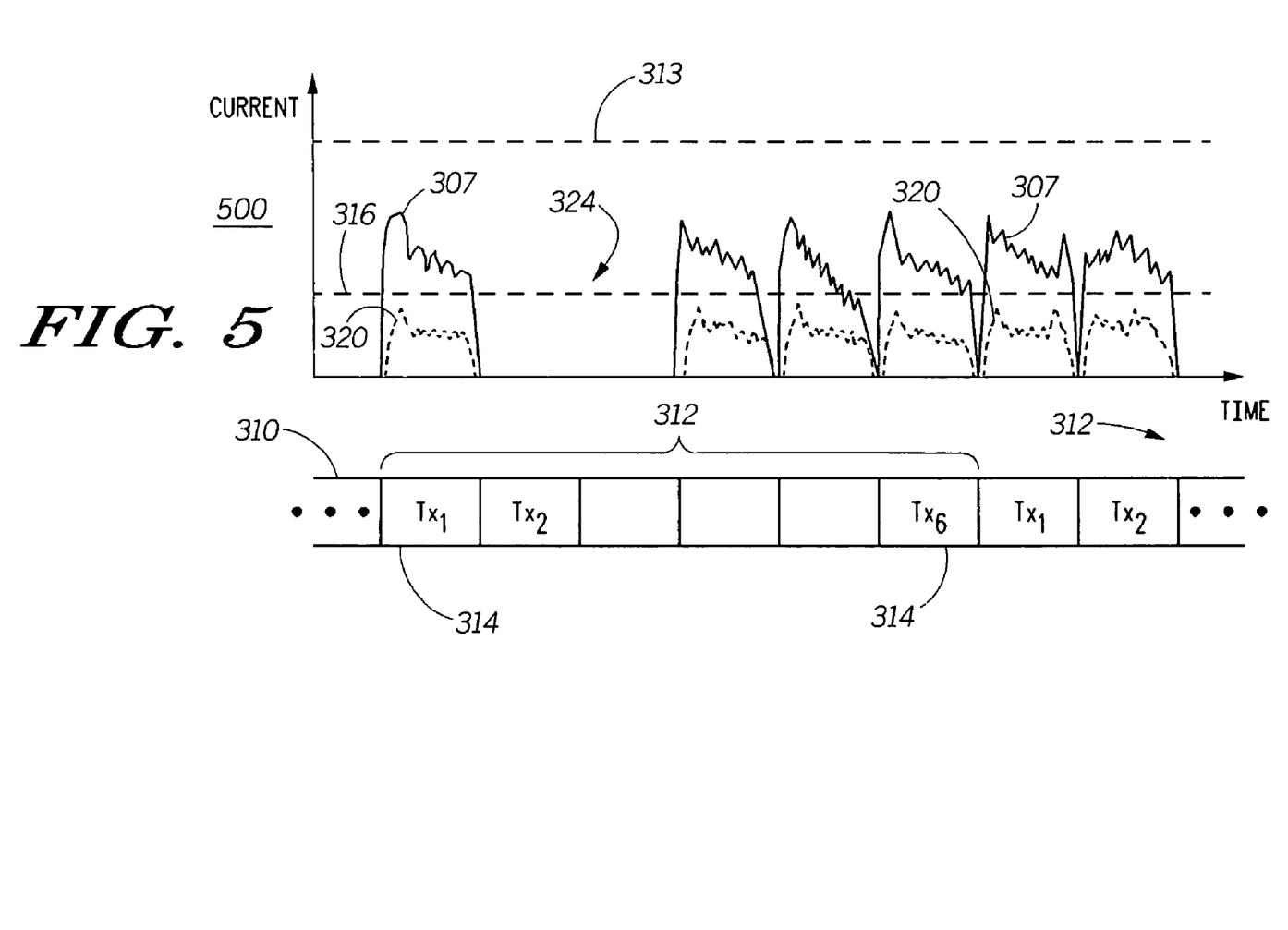
FIG. 5 illustrates another example of a diagram of the transmission of the data signal of FIG. 4 in accordance with an embodiment of the inventive arrangements.

Because it may be over a full second before the transmission of this data (or at least a portion of it) is complete, the processor 110 can temporarily disable the transmission component 114. In particular, the processor 110 can disable the power amplifier 128. By doing so, an operational opportunity 324 is created, as shown in the diagram 500. The created operational opportunity 324 can be long enough to allow the flash component 132 to operate. Once the flash component 132 has been operated, the processor 110 can reenable the power amplifier 128 or other suitable element of the transmission component 114, and the transmission of the data signal 307 can resume.

Disabling the transmission component 114 can mean any process where the transmission of a communications signal is temporarily suspended or suppressed to a level that will permit the flash component 132 to operate. It is important to note that disabling the transmission component 114 does not necessarily mean a complete shut down, as the output power level may be merely reduced to a suitable level. For example, the output of the transmission component 114 can be lowered to the predetermined threshold 316. In addition, while an example was described in which the power amplifier 128 was disabled, the invention is not so limited, as any other suitable part of a transmission component can be disabled.

As noted earlier, the flash component 132 may be one or more LEDs 138 or a conventional flash bulb having a capacitor 140. Thus, the phrase operating the flash component may depend on the structure of such a component. For example, if the flash component 132 is one or more LEDs 138, operating the flash component 132 can mean providing current to the LEDs 138. In particular, the power source 112 can provide current to the LEDs 138 during the operational opportunities, whether it is a preexisting operational opportunity 322 or a created operational opportunity 324. The power source 124 can also provide the current to the LEDs 138 when the power output of the transmission component 114 is below the predetermined threshold 316.

Similarly, the power source 112 can provide charging current to the capacitor 140 during a preexisting operational opportunity 322, a created operational opportunity 324 or when the output of the transmission component 114 is below the predetermined threshold 316. Of course, the flash component 132 may have other configurations, and its operation is not necessarily limited to the examples described here.

Although the invention has been described in relation to a TDMA system, it is understood that the invention is not so limited. For example, the process of determining whether the output power of the transmission component is below a predetermined threshold and operating the flash component while transmission is occurring if it is can be performed with other suitable communications systems. Also, the process of determining whether a preexisting operational opportunity exists is applicable to other systems. In fact, the preexisting operational opportunity can be any part of a communications procedure or protocol that may allow for the flash component to be operated to avoid drawing too much current from a power source. Finally, the step of disabling a transmission component to create an operational opportunity can be employed in other suitable systems.

Where applicable, the present invention can be realized in hardware, software or a combination of hardware and software. Any kind of computer system or other apparatus adapted for carrying out the methods described herein are suitable. A typical combination of hardware and software can be a mobile communication device with a computer program that, when being loaded and executed, can control the mobile communication device such that it carries out the methods described herein. The present invention can also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A method for flash control, comprising:
   in a portable electronic device, detecting a request to operate a flash component;
   determining whether a preexisting operational opportunity occurs for the flash component in a communications channel within a predetermined time from the detecting, while a transmission component in the portable electronic device is enabled;
   if the preexisting operational opportunity occurs, operating the flash component during the pre-existing operational opportunity;
   if no preexisting operational opportunity occurs, selectively disabling the transmission component to create an operational opportunity for the flash component; and
   during the created operational opportunity, operating the flash component.

2. The method according to claim 1, further comprising selectively reenabling the transmission component following the operation of the flash component.

3. The method according to claim 1 further comprising determining whether an output power of the transmission component is below a predetermined threshold.

4. The method according to claim 3, wherein if the output power of the transmission component is below the predetermined threshold, operating the flash component while the transmission component is enabled.

5. The method according to claim 1, wherein the operating the flash component step comprises at least one of charging a capacitor and providing current to a light emitting diode.

6. The method according to claim 1, wherein the selectively disabling step prevents an open circuit condition for a power source that provides power to the portable electronic device.

7. The method according to claim 1, wherein the portable electronic device is a mobile communications unit having a camera, the flash component provides a flash for the camera and the transmission component is a power amplifier.

8. A system for flash control, comprising:
   a flash component that produces a flash;
   a transmission component that transmits over a communications channel; and
   a processor that is communicatively coupled to the flash component and the transmission component, wherein the processor is operable to:
   detect a request to operate the flash component;
   determine whether a preexisting operational opportunity occurs for the flash component in the communications channel within a predetermined time from the detect, while the transmission component in the system is enabled;
   if the preexisting operational opportunity occurs, operate the flash component during the pre-existing operational opportunity;
   if no preexisting operational opportunity occurs, selectively disable the transmission component to create an operational opportunity for the flash component; and
   operate the flash component during the created operational opportunity.

9. The system according to claim 8, wherein the processor is further operable to reenable the transmission component following the operation of the flash component.

10. The system according to claim 8, wherein the processor is operable to determine whether an output power of the transmission component is below a predetermined threshold.

11. The system according to claim 10, wherein if the output power of the transmission component is below the predetermined threshold, the processor is further operable to operate the flash component while the transmission component is enabled.

12. The system according to claim 8, wherein the flash component includes at least one of a charging capacitor and a light emitting diode and the processor is further operable to operate the flash component by at least one of permitting the charging of the charging capacitor and permitting current to the light emitting diode.

13. The system according to claim 8, further comprising a power source coupled to the processor, wherein the selective disablement of the transmission component prevents an open circuit condition for the power source.

14. The system according to claim 8, wherein the system is part of a mobile communications unit having a camera and the flash component provides a flash for the camera.

15. A portable electronic device for flash control, comprising:
- a camera that captures images;
- a flash component that produces a flash for the camera;
- a transmission component that at least transmits over a communications channel; and
- a processor that is communicatively coupled to the camera, the flash component and the transmission component, wherein the processor is operable to:
  - detect a request to operate the flash component;
  - determine whether a preexisting operational opportunity occurs for the flash component in the communications channel within a predetermined time from the detect, while the transmission component in the system is enabled;
  - if the preexisting operational opportunity occurs, operate the flash component during the pre-existing operational opportunity;
  - if no preexisting operational opportunity occurs, selectively disable the transmission component to create an operational opportunity for the flash component; and
  - operate the flash component during the created operational opportunity.

* * * * *